(12) United States Patent
Honjou

(10) Patent No.: US 11,543,797 B2
(45) Date of Patent: Jan. 3, 2023

(54) CONTROL SYSTEM AND DISPLAY METHOD OF OPERATION SCREEN IMAGE

(71) Applicant: FANUC CORPORATION, Yamanashi (JP)

(72) Inventor: Kazushi Honjou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 462 days.

(21) Appl. No.: 16/783,079

(22) Filed: Feb. 5, 2020

(65) Prior Publication Data

US 2020/0293017 A1     Sep. 17, 2020

(30) Foreign Application Priority Data

Mar. 15, 2019  (JP) .............................. JP2019-048474

(51) Int. Cl.
*G05B 19/406* (2006.01)
*H04B 17/309* (2015.01)
*G08B 29/12* (2006.01)

(52) U.S. Cl.
CPC ........... *G05B 19/406* (2013.01); *G08B 29/12* (2013.01); *H04B 17/309* (2015.01); *G05B 2219/32128* (2013.01); *G05B 2219/32177* (2013.01)

(58) Field of Classification Search
CPC ................ G05B 19/406; G05B 19/409; G05B 2219/32128; G05B 2219/32177; G08B 29/12; H04B 17/309
See application file for complete search history.

(56) References Cited

U.S. PATENT DOCUMENTS

| 2009/0030550 A1* | 1/2009 | Nagata | B25J 19/06 700/251 |
|---|---|---|---|
| 2010/0106299 A1* | 4/2010 | Nagata | B25J 13/06 700/83 |

FOREIGN PATENT DOCUMENTS

| JP | 2005-250815 A | 9/2005 |
|---|---|---|
| JP | 2007-233817 A | 9/2007 |
| JP | 2014-191724 A | 10/2014 |
| JP | 2015-233223 A | 12/2015 |

(Continued)

OTHER PUBLICATIONS

An Office Action; "Notice of Reasons for Refusal", mailed by the Japanese Patent Office dated Aug. 10, 2021, which corresponds to Japanese Patent Application No. 2019-048474 and is related to U.S. Appl. No. 16/783,079; with English language translation.

*Primary Examiner* — Yuhui R Pan
(74) *Attorney, Agent, or Firm* — Studebaker & Brackett PC

(57) ABSTRACT

To reduce the disadvantage caused by low communication quality. A control system includes a controller configured to control an industrial machine, and a terminal device configured to communicate with the controller. The control system includes a communication quality measurement unit configured to measure as index indicating communication quality between the controller and the terminal device, a communication quality determination unit configured to determine the communication quality between the controller and the terminal device on the basis of the index measured by the communication quality measurement unit, a display unit configured to display an operation screen image for the controller, and a display control unit configured to control a display item of the operation screen image to be displayed on the display unit on the basis of result determined by the communication quality determination part.

7 Claims, 9 Drawing Sheets

(56) References Cited

FOREIGN PATENT DOCUMENTS

| | | |
|---|---|---|
| JP | 2016-112651 A | 6/2016 |
| JP | 2016-175145 A | 10/2016 |
| WO | 2006/103838 A1 | 10/2006 |

* cited by examiner

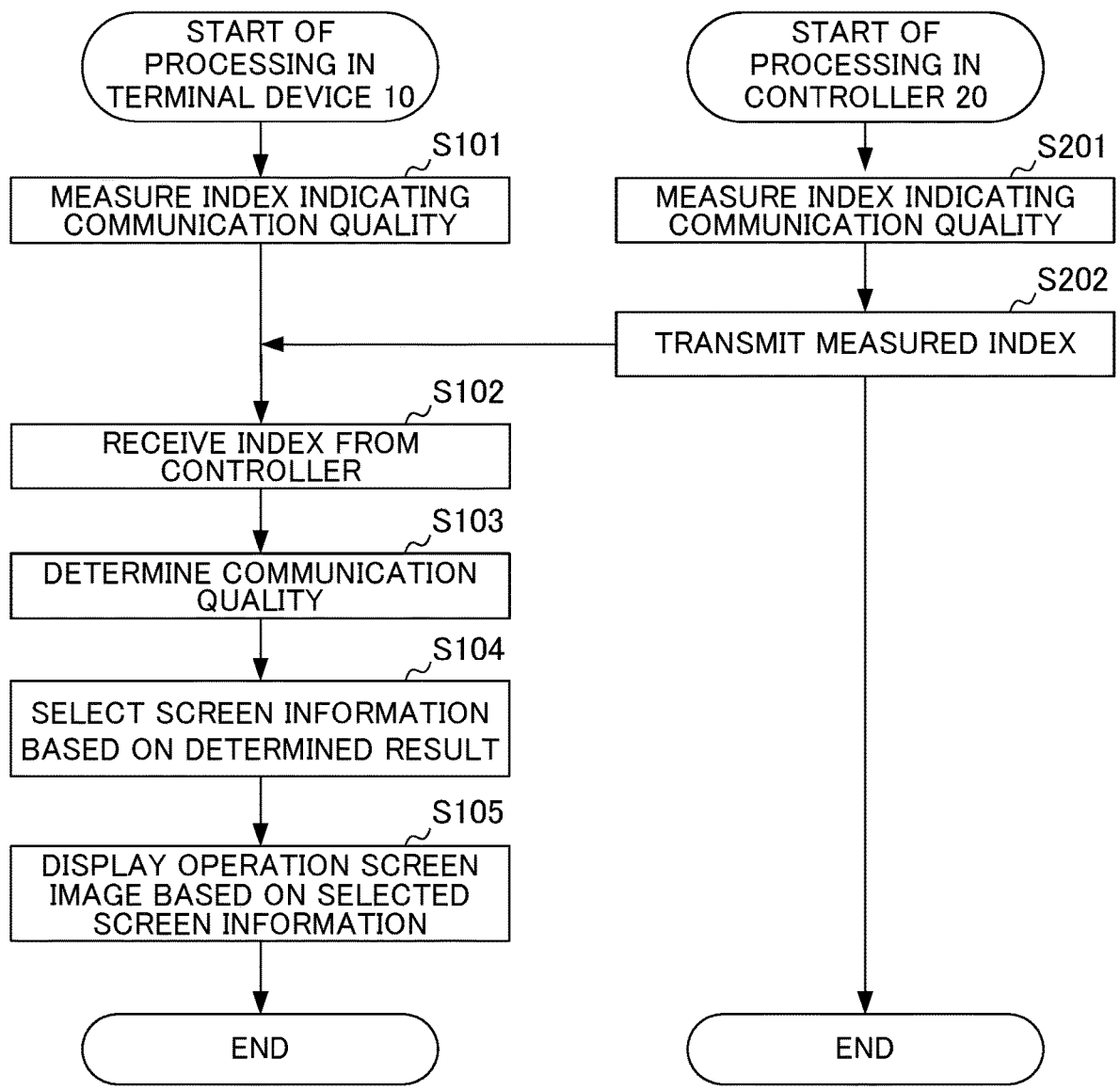

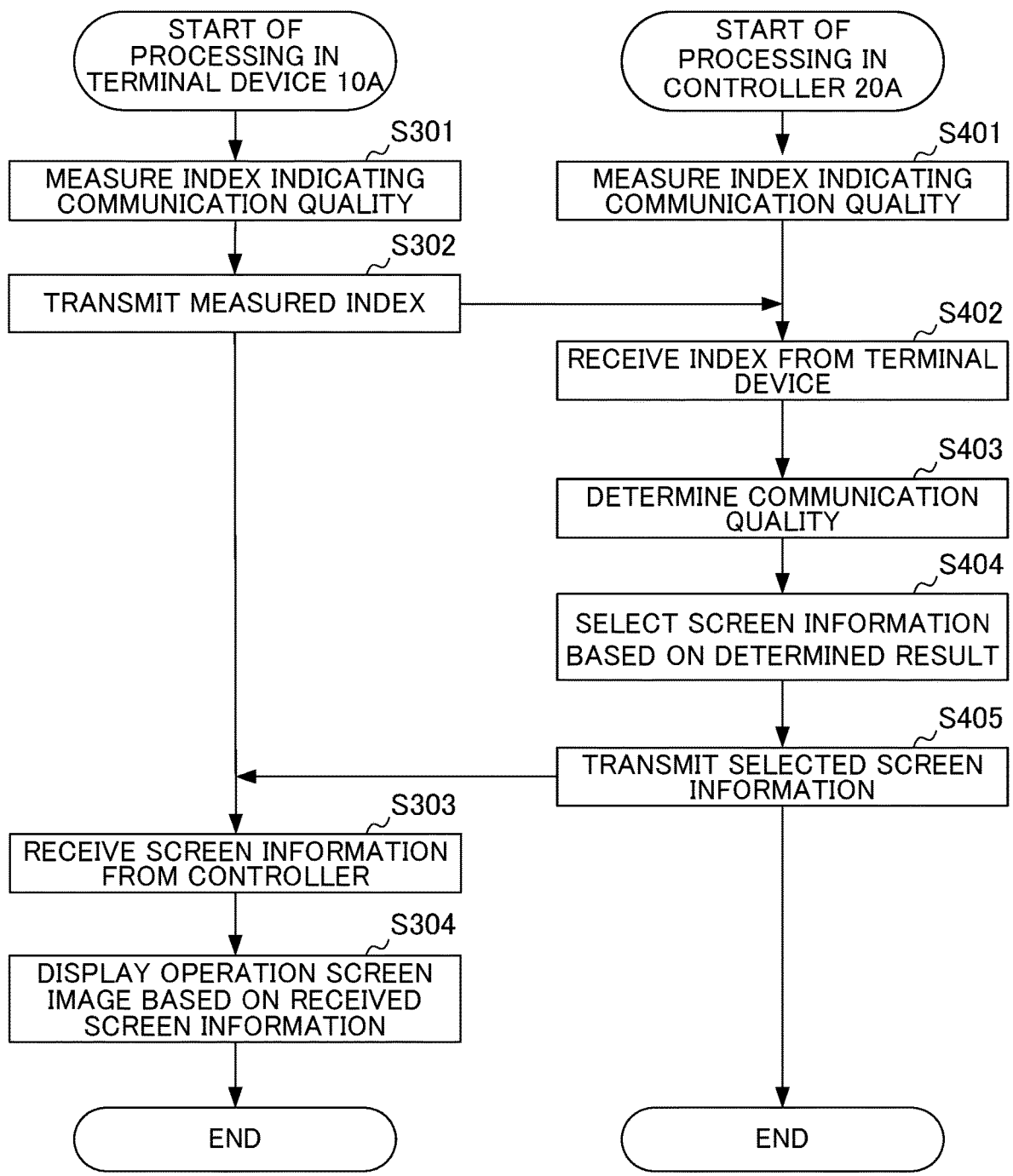

CONTROL SYSTEM AND DISPLAY METHOD OF OPERATION SCREEN IMAGE

This application is based on and claims the benefit of priority from Japanese Patent Application No. 2019-048474, filed on 15 Mar. 2019, the content of which is incorporated herein by reference.

BACKGROUND OF THE INVENTION

Field of the Invention

The present invention relates to a control system and a display method of an operation screen image.

Related Art

There is a terminal device, such as a tablet type terminal, a notebook type personal computer or a teaching device, configured to change a parameter of a machining program through wired communication or wireless communication to a numerical controller configured to control an industrial machine including a machine tool, a robot and the like.

In a known art, in an example, a numerical controller and a terminal device monitor the radio wave intensity between the numerical controller and the terminal device, and issue to an operator a warning indicating that a communication failure may occur and so on and/or stop an industrial machine in the case where the radio wave intensity falls to a preset threshold value or below (refer to, for example, Patent Document 1).

Patent Document 1: PCT International Publication No. WO2006/103838

SUMMARY OF THE INVENTION

In a factory or another place where an industrial machine is installed, the communication quality between a numerical controller and a terminal device may greatly change in a short time due to the noise or the like generated by the operation of the industrial machine. For this reason, in an example, even if the terminal device transmits a changed parameter of a machining program to the numerical controller, the machining program is not updated in the numerical controller, and thus the industrial machine may malfunction and damage a workpiece. In another case, even though the industrial machine issues an alarm, the terminal device may not display the alarm, and thus an operator may misrecognize that no abnormality occurs in the industrial machine.

Since the terminal device displays the machining status which is to be recognized by the operator but is deviated from the actual machining status, there are risks that the operator may be in danger and that economic losses may occur due to interruption in machining or the like. Moreover, since it takes time to grasp the situation in the case of remote operation, the damage may be increased.

Therefore, the disadvantage caused by low communication quality is desired to be reduced.

One aspect of the control system according to the present disclosure includes a controller configured to control an industrial machine, and a terminal device configured to communicate with the controller. The control system further includes a communication quality measurement unit configured to measure an index indicating communication quality between the controller and the terminal device, a communication quality determination unit configured to perform determination of the communication quality between the controller and the terminal device on the basis of the index measured by the communication quality measurement unit, a display unit configured to display an operation screen image for the controller, and a display control unit configured to control a display item of the operation screen image to be displayed on the display unit on the basis of result determined by the communication quality determination unit.

One aspect of the display method of the operation screen image for a controller according to present disclosure is executed in a control system which is realized by a computer including a display unit, and which includes a controller configured to control an industrial machine, and a terminal device configured to communicate with the controller. The display method includes a measuring step of measuring an index indicating communication quality between the controller and the terminal device, a determination step of determining the communication quality between the controller and the terminal device on the basis of the index measured in the measuring step, and a control step of controlling a display item of the operation screen image to be displayed on the display unit on the basis of result determined in the determination step.

On aspect of the present invention is capable of reducing the disadvantage caused by low communication quality.

BRIEF DESCRIPTION OF THE DRAWINGS

FIG. 6 is a flowchart for explaining the communication processing of the control system shown in FIG. 1.

FIG. 9 is a flowchart for explaining the communication processing of the control system shown in FIG. 7.

DETAILED DESCRIPTION OF THE INVENTION

Figure 1:
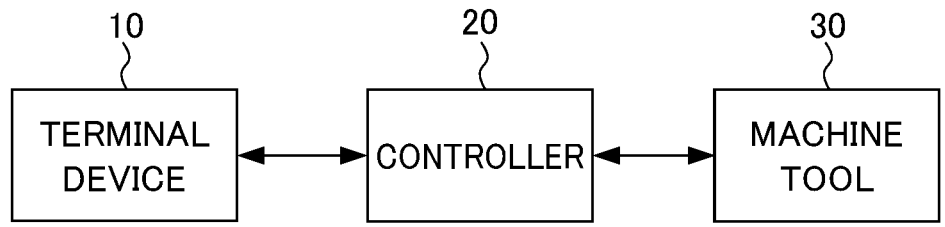
FIG. 1 is a diagram illustrating one example of a configuration of a control system according to a first embodiment.

Some embodiments according to the present disclosure will be described below by referring to the drawings.

First Embodiment

FIG. 1 is a diagram illustrating one example of a configuration of a control system according to the first embodiment. As shown in FIG. 1, the control system includes a terminal device 10, a controller 20, and a machine tool 30.

The terminal device 10 and the controller 20 may be communicably connected to each other through wired or wireless connection. Alternatively, the terminal device 10 and the controller 20 may be connected to each other via a predetermined network such as a LAN (local area network) or the Internet. The controller 20 and machine tool 30 may be communicably connected to each other through wired or wireless connection. It is noted that each of the terminal device 10, the controller 20 and the machine tool 30 includes a communication unit not shown configured to perform mutual communication through such connection.

The terminal device 10 is, for example, a portable electronic apparatus such as a tablet type terminal, a notebook type personal computer or a teaching device, or a non-portable electronic apparatus. The terminal device 10 changes a parameter of a machining program for the controller 20 to control the operation of the machine tool 30, and displays an operation status of the machine tool 30. The details of the terminal device 10 will be described below.

The controller 20, which is a numerical controller known to those skilled in the art, controls the operation of the machine tool 30 on the basis of the machining program and/or the machining command received from the terminal device 10, as an example.

The machine tool 30 is a machine configured to perform machining based on the numerical control by the controller 20.

It is noted that the present embodiment is applicable widely to general industrial machines, not being limited to the machine tool 30. Industrial machines herein are various machines, for example, a machine tool, an industrial robot, a service robot, a forging machine, and an injection molding machine.

<Functional Blocks Provided in Control System>

The functional blocks provided in the control system are described below.

Figure 2:
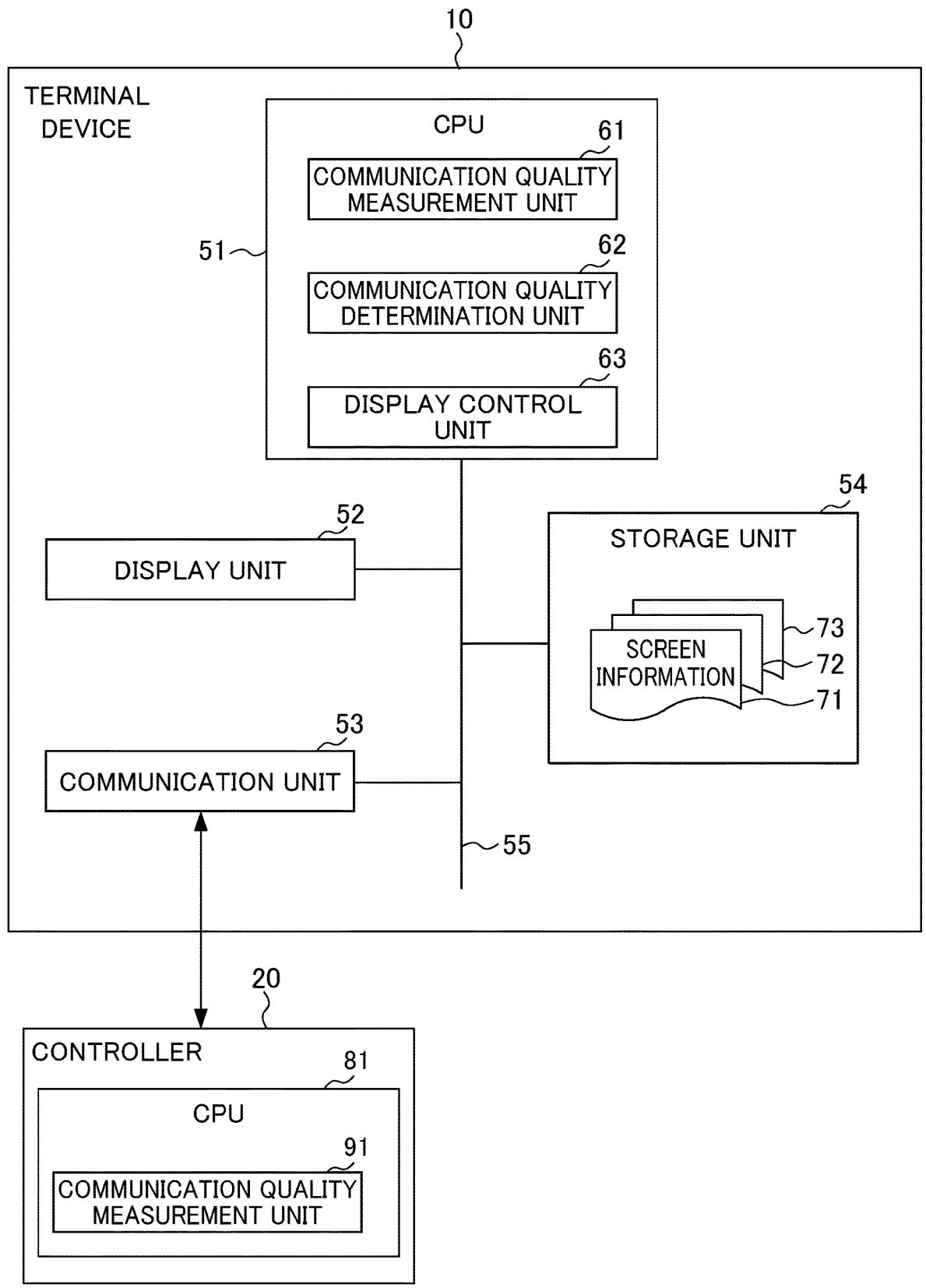
FIG. 2 is a functional block diagram illustrating functional configuration examples of a terminal device and a controller in the control system shown in FIG. 1.

FIG. 2 is a functional block diagram illustrating functional configuration examples of the terminal device 10 and the controller 20 in the control system shown in FIG. 1.

As shown in FIG. 2, the terminal device 10 includes a CPU 51, a display unit 52, a communication unit 53 and a storage unit 54. The CPU 51, the display unit 52, the communication unit 53 and the storage unit 54 are communicably connected to one another via a bus 55.

The CPU 51 executes various types of processing according to various programs including control programs stored in the storage unit 54, for example, a ROM (read only memory) or an HDD (hard disk drive), to control the operation of respective units. The CPU 51 acquires the functions of a communication quality measurement unit 61, a communication quality determination unit 62 and a display control unit 63, by executing a control program.

The communication quality measurement unit 61 measures an index indicating the communication quality between the terminal device 10 and the controller 20 on the basis of the signal received from the controller 20 via the communication unit 53 to be described below.

The communication quality determination unit 62 determines the communication quality between the terminal device 10 and the controller 20 on the basis of the indexes measured by the communication quality measurement unit 61 and a communication quality measurement unit 91 of the controller 20 to be described below.

The display control unit 63 controls display items of the operation screen image to be displayed on the display unit 52 to be described below, on the basis of the result determined by the communication quality determination unit 62.

The display unit 52, which is realized by, for example, a liquid crystal display, displays the operation screen image for the controller 20 on the basis of a control command from the display control unit 63.

The communication unit 53, which is, for example, an input/output interface, may be connected to the controller 20 through wired or wireless connection, to control the communication between the terminal device 10 and the controller 20. Alternatively, the communication unit 53, which is, for example, a network interface, may be connected to the controller 20 via a network not shown such as the Internet, to control the communication between the terminal device 10 and the controller 20.

The storage unit 54, which is realized by a ROM, an HDD or the like as described above, stores not only various programs including control programs, but also data of screen information 71, 72, 73 indicating the display items of the operation screen image which are to be selected by the display control unit 63 on the basis of the result determined by the communication quality determination unit 62.

On the other hand, the controller 20 is able to be realized by an electronic apparatus such as a personal computer, and the hardware configuration thereof may be basically the same as the hardware configuration of the terminal device 10. The description thereof will be omitted herein.

A CPU 81 included in the controller 20 functions as the communication quality measurement unit 91, by executing a control program stored in a ROM, an HDD or the like not shown.

The communication quality measurement unit 91 measures the index indicating the communication quality between the terminal device 10 and the controller 20, on the basis of the signal received from the terminal device 10 via the communication unit not shown of the controller 20. The communication quality measurement unit 91 transmits the measured index via the communication unit not shown to the terminal device 10.

<About Communication Quality>

The indexes indicating the communication quality to be measured by the communication quality measurement unit 61 and the communication quality measurement unit 91 are described below.

Each of the communication quality measurement unit 61 and the communication quality measurement unit 91 is capable of measuring, by using a well-known method, at least one or the combination such as of a communication error rate, a communication speed and a noise level in a signal exchanged between the terminal device 10 and the controller 20 through wired or wireless connection.

Figure 3:
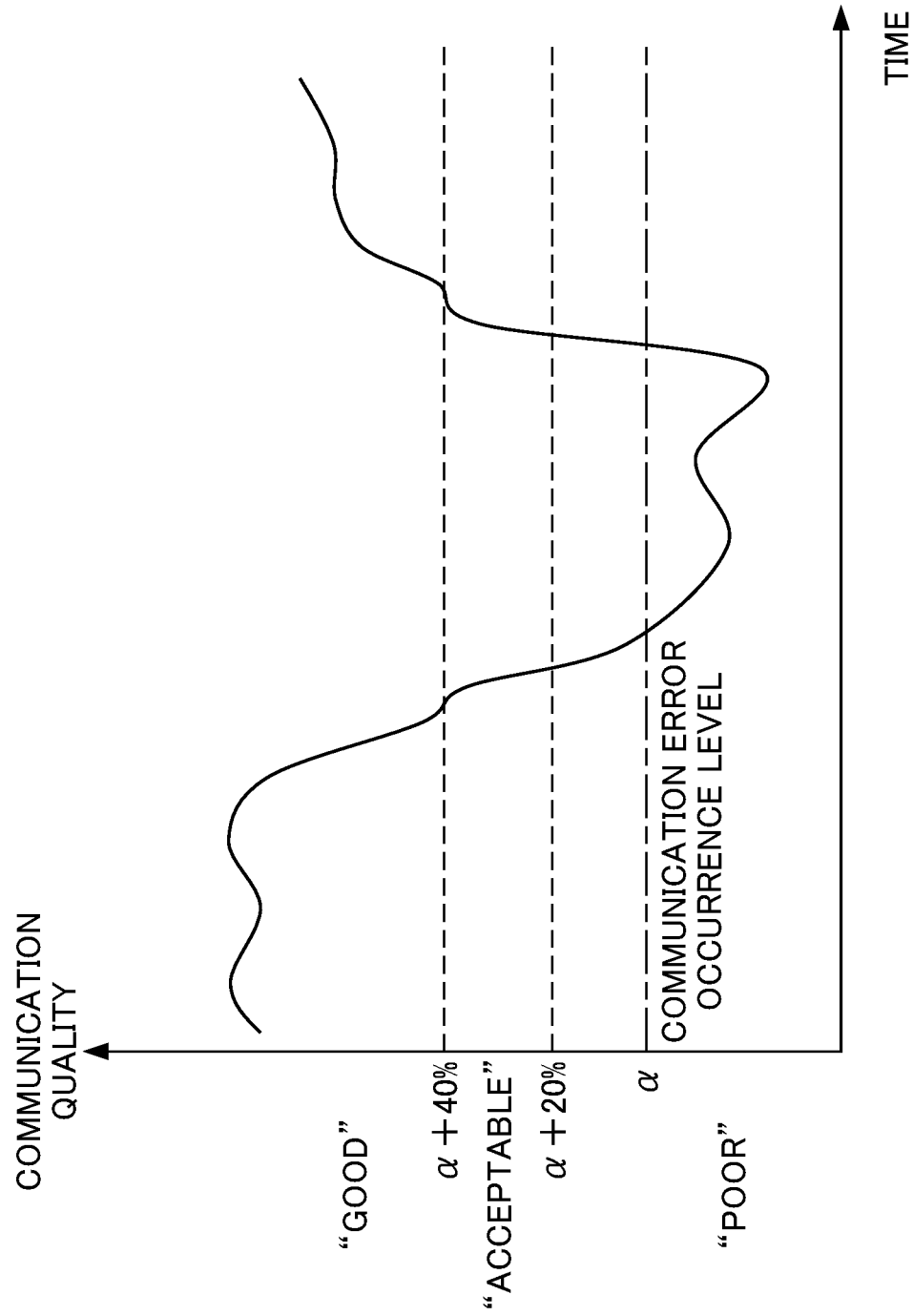
FIG. 3 is a diagram indicating one example of temporal change of an index indicating the communication quality measured by the quality measurement unit shown in FIG. 2.

FIG. 3 is a diagram indicating one example of temporal change of the index indicating the communication quality measured by the communication quality measurement unit 61.

As shown in FIG. 3, the communication quality (index) between the terminal device 10 and the controller 20 indicated by the solid line changes with time. It is noted that the dot-and-dash line in the drawing indicates a communication error occurrence level $\alpha$, and in the case where the communication quality is equal to or lower than the communication error occurrence level $\alpha$, the communication between the terminal device 10 and the controller 20 is not available. The two broken lines in the drawing indicate, for example, the two levels of the communication quality which are higher by 20% and 40% than the communication error occurrence level $\alpha$, respectively.

The communication quality determination unit 62 of the present embodiment determines the communication quality as "good," in the case where the indexes measured by the communication quality measurement unit 61 and the communication quality measurement unit 91 indicate the levels higher than the communication error occurrence level α by at least 40%. The communication quality determination unit 62 determines the communication quality as "acceptable," in the case where, in the indexes measured by the communication quality measurement unit 61 and the communication quality measurement unit 91, the smaller index indicates the level higher than the communication error occurrence level α by at least 20% and higher than the communication error occurrence level α by less than 40%. The communication quality determination unit 62 determines the communication quality as "poor," in the case where, in the indexes measured by the communication quality measurement unit 61 and the communication quality measurement unit 91, the smaller index indicates the level higher than the communication error occurrence level α by less than 20% and lower than the communication error occurrence level α.

It is noted that although the communication quality determination unit 62 determines the communication quality between the terminal device 10 and the controller 20 as "good," "acceptable" or "poor," on the basis of the threshold value higher than the communication error occurrence level α by 20% and the threshold value higher than the communication error occurrence level α by 40%, the present invention is not limited thereto. The threshold values for determining the quality as "good," "acceptable" or "poor" may be set to arbitrary values.

Further, although the communication quality determination unit 62 determines the communication quality between the terminal device 10 and the controller 20 as "good," "acceptable" or "poor," the present invention is not limited thereto. The communication quality determination unit 62 may determine the quality in two levels of "good" and "poor," or in four or more levels.

<About Operation Screen Image>

The operation screen image (user interface) and the display items on the operation screen image based on the communication quality are described below.

Figure 4:
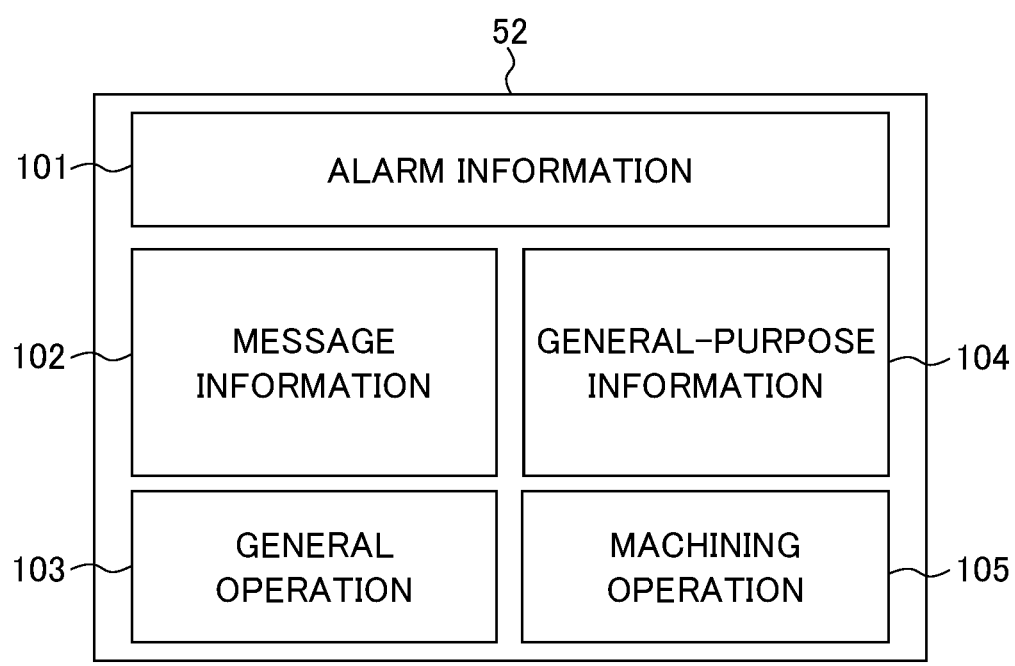
FIG. 4 is a diagram illustrating one example of the operation screen image of the case where the communication quality is "good."

FIG. 4 a diagram illustrating one example of the operation screen image of the case where the communication quality is "good."

As shown in FIG. 4, the operation screen image to be displayed on the display unit 52 includes, for example, display items 101, 102, 103, 104, 105. The display item 101 is an item displaying, for example, alarm information such as abnormality occurring in the machine tool 30. The display item 102 is an item displaying, for example, message information not requiring a quick response. The display item 103 is an item for accepting an input of general operation not requiring a quick response other than machining operation, via an input device such as a touch panel not shown of the terminal device 10. The display item 104 is an item for displaying, for example, general-purpose information which causes no hindrance even if the updating thereof is delayed. The display item 105 is an item for accepting an input of machining operation such as cutting via an input device such as a touch panel not shown of the terminal device 10.

In other words, the display items 101, 105 display the information requiring real-time response, that is, the information which is required to be reliably shared between the terminal device 10 and the controller 20. On the other hand, the display items 102 to 104 display the information not requiring real-time response, that is, the information which is not required to be shared between the terminal device 10 and the controller 20.

In an example, in the case where the communication quality determination unit 62 determines the communication quality as "good," the terminal device 10 and the controller 20 are able to reliably communicate with each other and are able to share information, and thus the display control unit 63 selects the screen information 71 for displaying all of the display items 101 to 105. As shown in FIG. 4, the display control unit 63 causes the display unit 52 to display all of the display items 101 to 105, on the basis of the selected screen information 71.

Figure 5A:
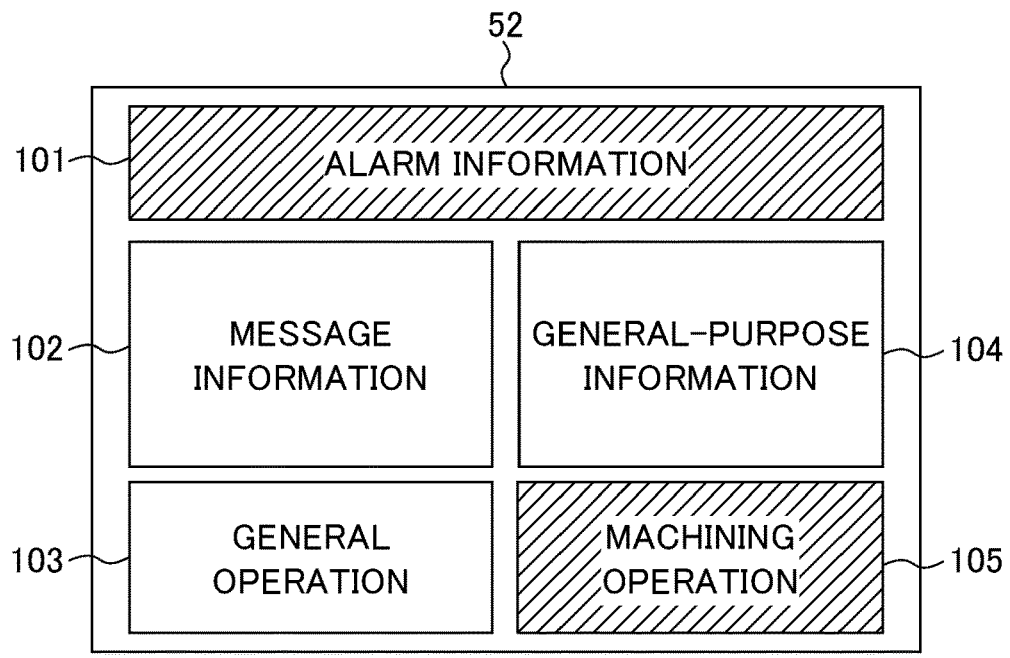
FIG. 5A is a diagram illustrating one example of the operation screen image of the case where the communication quality is "acceptable."

In the case where the communication quality determination unit 62 determines the communication quality as "acceptable," the communication between the terminal device 10 and the controller 20 is unstable and there is a risk that information may not be shared. The display control unit 63 thus selects the screen information 72 for displaying the display items 102 to 104. As shown in FIG. 5A as an example, the display control unit 63 causes the display unit 52 to display the display items 102 to 104, on the basis of the selected screen information 72. It is noted that the display items 101, 105 not to be displayed are indicated with hatching.

Figure 5B:
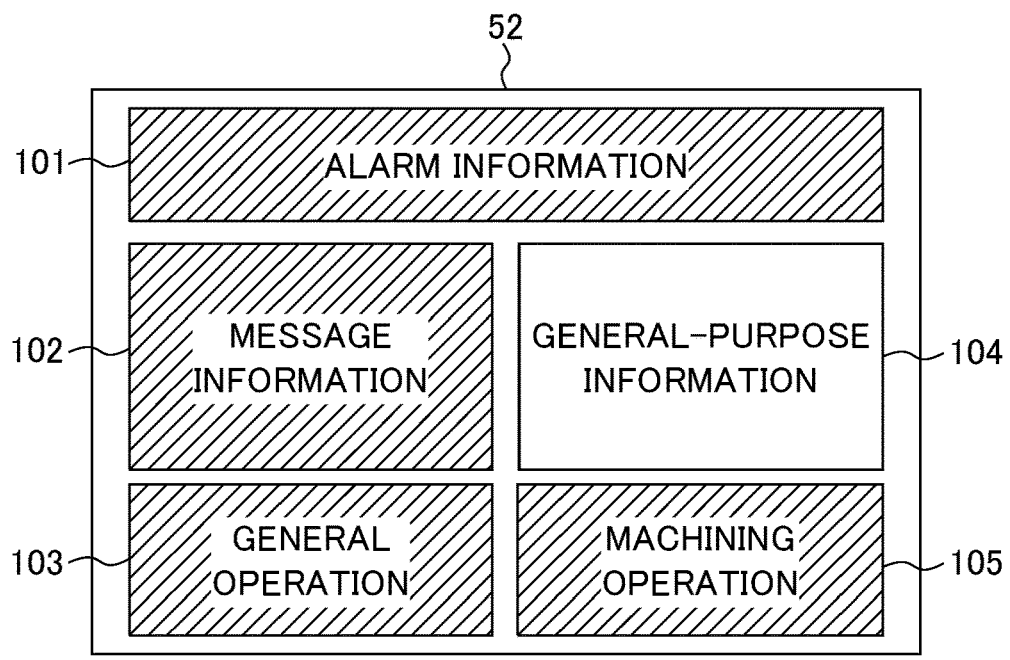
FIG. 5B is a diagram illustrating one example of the operation screen image of the case where the communication quality is "poor."

In the case where the communication quality determination unit 62 determines the communication quality between the terminal device 10 and the controller 20 is "poor," the communication between the terminal device 10 and the controller 20 is not available and thus the information is not able to be shared. The display control unit 63 thus selects, for example, the screen information 73 for displaying just the general-purpose information of the display item 104. As shown in FIG. 5B, the display control unit 63 causes the display unit 52 to display the display item 104, on the basis of the selected screen information 73.

FIG. 5A is a diagram illustrating one example of the operation screen image of the case where the communication quality is "acceptable." FIG. 5B is a diagram illustrating one example of the operation screen image of the case where the communication quality is "poor."

In this way, information is able to be reliably shared between the terminal device 10 and the controller 20. A user of the terminal device 10 is able to grasp the communication status between the terminal device 10 and the controller 20 from the operation screen image displayed on the display unit 52, thereby enabling to prevent misrecognition of the displayed information. That is, when change in a parameter such as of a machining program is acceptable, the change is able to be reliably reflected on the controller 20. When alarm display is available, the same latest alarm is able to be displayed on the terminal device 10 and the controller 20. When machining program display and/or execution thereof are/is available, the display corresponding to the actual machining status is available.

It is noted that although the operation screen image of the present embodiment has the display items 101 to 105, the present invention is not limited thereto. In an example, the operation screen image may have other display items than the display items 101 to 105. The layout of the display items on the operation screen image may be changed as appropriate for each user of the terminal device 10, as an example.

<Communication Processing of Control System>

FIG. 6 is a flowchart for explaining the communication processing of the control system shown in FIG. 1.

In step S101, the communication quality measurement unit 61 of the terminal device 10 measures the index indicating the communication quality between the terminal device 10 and the controller 20, on the basis of the signal received from the controller 20 via the communication unit 53.

In step S201, the communication quality measurement unit 91 of the controller 20 measures the index indicating the communication quality between the terminal device 10 and the controller 20, on the basis of the signal received from the terminal device 10 via the communication unit not shown of the controller 20.

In step S202, the communication quality measurement unit 91 transmits the index measured in step S201 to the terminal device 10 via the communication unit not shown of the controller 20.

In step S102, the communication quality determination unit 62 receives the index from the controller 20 via the communication unit 53.

In step S103, the communication quality determination unit 62 determines the communication quality between the terminal device 10 and the controller 20, on the basis of the indexes respectively measured by the communication quality measurement unit 61 and the communication quality measurement unit 91.

In step S104, the display control unit 63 selects one of the screen information 71 to 73 on the basis of the result determined in step S103.

In step S105, the display unit 52 displays the operation. screen image based on the screen information selected in step S104.

It is noted that the steps from step S101 to step S105 of the terminal device 10 and the steps of step S201 and step S202 of the controller 20 may be executed in time series, or may be executed in parallel.

As described above, in the control system according to the first embodiment, the terminal device 10 and the controller 20 measure the indexes indicating the communication quality, and the terminal device 10 determines the communication quality between the terminal device 10 and the controller 20 on the basis of the indexes measured by the terminal device 10 and the controller 20. The control system causes the display unit 52 of the terminal device 10 to display the operation screen image based on the determined communication quality. In this way, the control system is capable of reducing the disadvantage caused by low communication quality.

A user of the terminal device 10 is able to grasp the communication status between the terminal device 10 and the controller 20 from the operation screen image displayed on the display unit 52, thereby enabling to prevent misrecognition of the displayed information. That is, when change in a parameter such as of a machining program is acceptable, the change is able to be reliably reflected on the controller 20. When alarm display is available, the same latest alarm is able to be displayed on the terminal device 10 and the controller 20. When machining program display and/or execution thereof are/is available, the display corresponding to the actual machining status is available.

Second Embodiment

A control system according to the second embodiment differs from the control system according to the first embodiment in that a controller includes a communication quality determination unit, a display control unit, and screen. information.

The second embodiment is described below.

Figure 7:
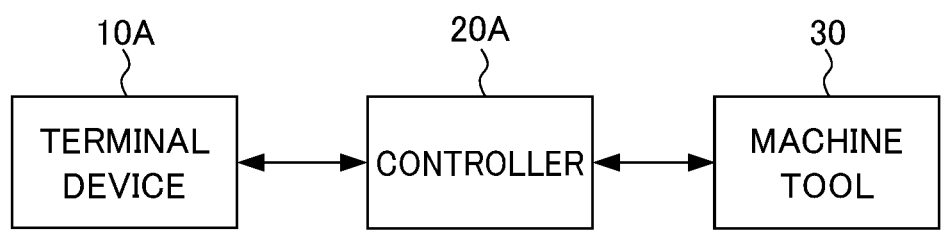
FIG. 7 is a diagram illustrating one example of a configuration of a control system according to a second embodiment.

FIG. 7 is a diagram illustrating one example of a configuration of the control system according to the second embodiment. As shown in FIG. 7, the control system includes a terminal device 10A, a controller 20A, and the machine tool 30. It is noted that the elements having the same functions as those shown in FIG. 1 are denoted by the same reference numerals, and the descriptions thereof will be omitted.

Figure 8:
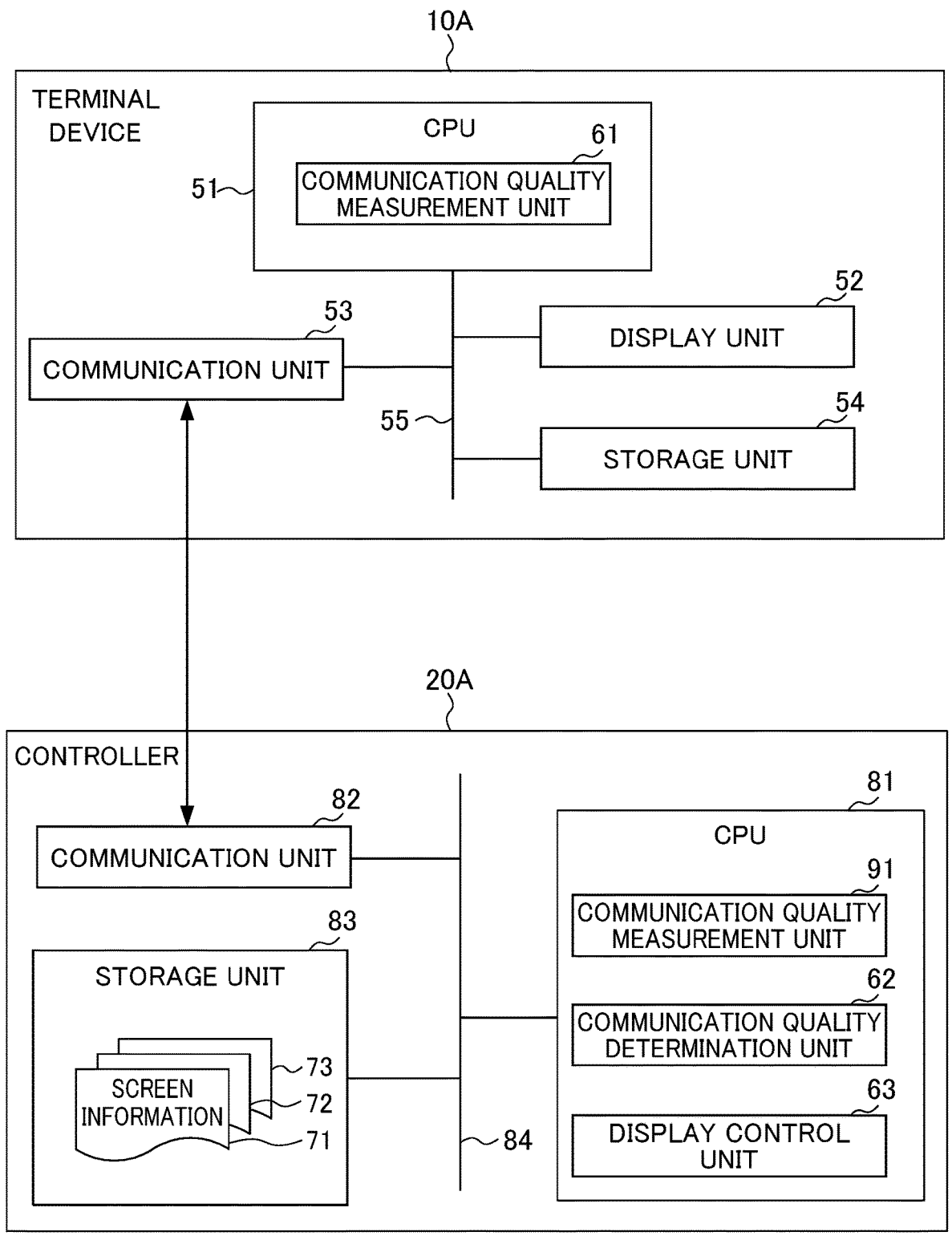
FIG. 8 is a functional block diagram illustrating functional configuration examples of the terminal device and the controller shown in FIG. 7.

FIG. 8 is a functional block diagram illustrating functional configuration examples of the terminal device 10A and the controller 20A shown in FIG. 7. It is noted that the functional blocks having the same functions as those in the block diagram shown in FIG. 2 are denoted by the same reference numerals, and the descriptions thereof will be omitted.

Similarly to the case shown in FIG. 2, the terminal device 10A is configured with the CPU 51, the display unit 52, the communication unit 53 and the storage unit 54.

The CPU 51 acquires the function of the communication quality measurement unit 61, by executing a control program stored in the storage unit 54.

The controller 20A is configured with not only the CPU 81, but also a communication unit 82 and a storage unit 83. The CPU 81, the communication unit 82 and the storage unit 83 are communicably connected to one another via a bus 84.

The CPU 81 executes various types of processing according to various programs including control programs stored in the storage unit 83, for example, a ROM or an HDD, to control the operation of respective units. The CPU 81 acquires the functions of the communication quality measurement unit 91, the communication quality determination unit 62 and the display control unit 63, by executing a control program.

The communication unit 82, which is, for example, an input/output interface, may be connected to the terminal device 10A through wired or wireless connection, to control the communication between the terminal device 10A and the controller 20A. Alternatively, the communication unit 82, which is, for example, a network interface, may be connected to the terminal device 10A via a network not shown such as the Internet, to control the communication between the terminal device 10A and the controller 20A.

The storage unit 83, which is realized by a ROM, an HDD or the like as described above, stores not only various programs including control programs, but also data of the screen information 71 to 73 indicating the display items of the operation screen image which are to be selected by the display control unit 63 on the basis of the result determined by the communication quality determination unit 62 and which are to be displayed on the display unit 52 of the terminal device 10A.

<Communication Processing of Control System>

FIG. 9 is a flowchart for explaining the communication processing of the control system shown in FIG. 7.

In step S301, the communication quality measurement unit 61 of the terminal device 10A measures the index indicating the communication quality between the terminal device 10A and the controller 20A, on the basis of the signal received from the controller 20A via the communication unit 53.

In step S302, the communication quality measurement unit 61 transmits the index measured in step S301 to the controller 20A via the communication unit 53.

In step S401, the communication quality measurement unit 91 of the controller 20A measures the index indicating the communication quality between the terminal device 10A and the controller 20A, on the basis of the signal received from the terminal device 10A via the communication unit 82.

In step S402, the communication quality determination unit 62 receives the index from the terminal device 10A via the communication unit 82.

In step S403, the communication quality determination unit 62 determines the communication quality between the terminal device 10A and the controller 20A, on the basis of the indexes respectively measured by the communication quality measurement unit 61 and the communication quality measurement unit 91.

In step S404, the display control unit 63 selects one of the screen information 71 to 73 on the basis of the result determined in step S403.

In step S405, the display control unit 63 transmits the screen information selected in step S404 to the terminal device 10A via the communication unit 82.

In step S303, the display unit 52 receives the screen information from the controller 20A via the communication unit 53.

In step S304, the display unit 52 displays the operation screen image based on the screen information received in step S303.

It is noted that the steps from step S301 to step S304 of the terminal device 10A and the steps from step S401 to step S405 of the controller 20A may be executed in time series, or may be executed in parallel.

As described above, in the control system according to the second embodiment, the terminal device 10A and the controller 20A measure the indexes indicating the communication quality, and the controller 20A determines the communication quality between the terminal device 10A and the controller 20A on the basis of the indexes measured by the terminal device 10A and the controller 20A. The control system causes the display unit 52 of the terminal device 10A to display the operation screen image based on the determined. communication quality. In this way, the control system is capable of reducing the disadvantage caused by low communication quality.

A user of the terminal device 10A is able to grasp the communication status between the terminal device 10A and the controller 20A from the operation screen image displayed on the display unit 52, thereby enabling to prevent misrecognition of the displayed information. That is, when change in a parameter such as of a machining program is acceptable, the change is able to be reliably reflected on the controller 20A. When alarm display is available, the same latest alarm is able to be properly displayed on the terminal device 10A and the controller 20A. When machining program display and/or execution thereof are/is available, the display corresponding to the actual machining status is available.

Although the first embodiment and the second embodiment have been described so far, the control system according to the present invention is not limited to the above-described embodiments. The modifications, improvements and the like within the scope allowing to achieve the object are included.

<Modification 1>

In an example, although the communication quality determination unit 62 determines the communication quality on the basis of the indexes measured respectively by the communication quality measurement unit 61 and the communication quality measurement unit 91 in the first embodiment and the second embodiment described above, the present invention is not limited thereto. In an example, the communication quality determination unit 62 may analyze a machining program for the machine tool 30, and change the determination of the communication quality according to the timing at which the machine tool 30 operates. In an example, the communication quality determination unit 62 may change the communication quality from "good" or "acceptable" to "poor," at timing prior to the start of the operation having the risk of generating noise or the like large enough to make the communication difficult between the terminal device 10 or 10A and the controller 20 or 20A. In this way, the influence on the communication caused by the noise or the like generated by the machine tool 30 is able to be avoided.

In the case where the communication between the terminal device 10 or 10A and the controller 20 or 20A is performed through wireless communication, the communication quality determination unit 62 may change the determination of the communication quality according to the presence/absence of other wireless devices and/or timing prior to the start of the communication by other wireless devices using the same wireless frequency band.

The communication quality determination unit 62 may change the determination of the communication quality on the basis of the use time zone by the machine tool 30.

<Modification 2>

In an example, although one unit of the terminal device 10 or 10A and one unit of the controller 20 or 20A perform mutual communication in the first embodiment and the second embodiment described above, the present invention is not limited thereto. In an example, the terminal device 10 or 10A may communicate with a plurality of the controllers 20 or 20A. In this case, the terminal device 10 or 10A may display, on the display unit 52, a plurality of the display screen images respectively corresponding to the plurality of controllers 20 or 20A, in which display items are controlled on the basis of the communication quality respectively between the terminal device 10 or 10A and the plurality of controllers 20 or 20A.

Alternatively, the controller 20 or 20A may communicate with a plurality of the terminal devices 10 or 10A. In this case, each of the plurality of terminal devices 10 or 10A may display, on the display unit 52, the operation screen image based on the communication quality respectively between the respective terminal devices 10 or 10A and the controller 20 or 20A.

<Modification 3>

In an example, although each of the terminal device 10 (10A) and the controller 20 (20A) has the communication quality measurement unit (61, 91) in the first embodiment and the second embodiment described above, the present invention is not limited thereto. In an example, only either the terminal device 10 (10A) or the controller 20 (20A) may have the communication quality measurement unit.

It is noted that each function included in the control systems according to the first embodiment and the second embodiment described above may be realized by hardware, software, or the combination thereof. Being realized by software herein means that a computer reads and executes a program, whereby an embodiment is realized.

Programs are able to be stored by use of various types of non-transitory computer readable media, and are able to be supplied to a computer. Such non-transitory computer readable media include various types of tangible storage media. Examples of non-transitory computer readable media include a magnetic recording medium (for example, a flexible disk, a magnetic tape, a hard disk drive), a magneto-optical recording medium (for example, a magneto-optical disk), a CD-ROM (read only memory), a CD-R, a CD-R/W, and a semiconductor memory (for example, a mask ROM, a PROM (programmable ROM), an EPROM (erasable PROM), a flash ROM, a RAM). Programs may be supplie to a computer by use of various types of transitory computer readable media. Examples of transitory computer readable media include an electrical signal, an optical signal, and an electromagnetic wave. A transitory computer readable medium is capable of supplying a program to a computer via a wired communication path such as an electric wire and an optical fiber, or a wireless communication path.

It is noted that the step of describing a program to be stored in a recording medium includes not only the processing to be executed in time series in the order, but also the processing to be executed in parallel or indivdually, instead of being executed all the time in time series.

In other words with respect to the contents described so far, the control system and the display method of the operation screen image according to the present disclosure are available in various types of embodiments having the following configurations.

(1) The control system includes the controller 20, 20A configured to control an industrial machine (the machine tool 30), and the terminal device 10, 10A configured to communicate with the controller 20, 20A. The control system further includes the communication. quality measurement unit configured to measure an index indicating communication quality between the controller 20, 20A and the terminal device 10, 10A, the communication quality determination unit 62 configured to perform determination of the communication quality between the controller 20, 20A and the terminal device 10, 10A on the basis of the index measured by the communication quality measurement unit, the display unit 52 configured to display an operation screen image for the controller 20, 20A, and the display control unit 63 configured to control a display item of the operation screen image to be displayed on the display unit 52 on the basis of result determined by the communication. quality determination unit 62.

The control system is capable of reducing the disadvantage caused by low communication quality.

(2) The terminal device 10 may include the communication quality determination unit 62.

Such configuration enables the control system to control a display item of the operation screen image on the basis of the communication environment in the terminal device 10.

(3) The controller 20A may include the communication quality determination unit 62.

Such configuration enables the control system to control a display item of the operation screen image on the basis of the communication environment in the controller 20A.

(1) Each of the controller 20, 20A and the terminal device 10, 10A may include the communication quality measurement unit 61, 91.

Such configuration enables the control system to accurately determine the communication quality between the terminal device 10, 10A and the controller 20, 20A.

(5) The communication quality determination unit 62 may change the determination of the communication quality according to timing of operation of the industrial machine (the machine tool 30).

Such change enables the control system to avoid the influence on the communication caused by the noise or the like generated by the machine tool 30.

(6) In the case where the terminal device 10, 10A communicates with each of a plurality of the controllers 20, 20A, the communication quality determination unit 62 may determine the communication quality between each of the plurality of controllers 20, 20A and the terminal device 10, 10A, and the display control unit 63 may cause the display unit 52 to display a plurality of the operation screen images respectively corresponding to the plurality of controllers 20, 20A, and the operation screen images respectively include the display items controlled on the basis of the communication quality between the terminal device 10, 10A and each of the plurality of controllers 20, 20A determined by the communication quality determination unit 62.

In this case, in the control system, one unit of the terminal device 10, 10A is capable of monitoring the operation status of each of the plurality of controllers 20, 20A.

(7) The display method of the operation screen image for the controller 20, 20A is executed in the control system which is realized by the computer including the display unit 52 according to the present invention and which includes the controller 20, 20A configured to control the industrial machine (the machine tool 30), and the terminal device 10, 10A configured to communicate with the controller 20, 20A. The display method includes the measuring step of measuring the index indicating communication quality between the controller 20, 20A and the terminal device 10, 10A, the determination step of determining the communication quality between the controller 20, 20A and the terminal device 10, 10A on the basis of the index measured in the measuring step, and the control step of controlling a display item of the operation screen image to be displayed on the display unit 52, on the basis of result determined in the determination step.

The display method of the operation screen image enables to exhibit the same effects as those in (1).

EXPLANATION OF REFERENCE NUMERALS

10, 10A TERMINAL DEVICE
20, 20A CONTROLLER
30 MACHINE TOOL
51, 81 CPU
52 DISPLAY UNIT
53, 82 COMMUNICATION UNIT
54, 83 STORAGE UNIT
61, 91 COMMUNICATION QUALITY MEASUREMENT UNIT
62 COMMUNICATION QUALITY DETERMINATION UNIT
63 DISPLAY CONTROL UNIT

What is claimed is:

1. A control system comprising a controller configured to control an industrial machine, and a terminal device configured to communicate with the controller, the control system further comprising:
 a communication quality measurement unit configured to measure an index indicating communication quality between the controller and the terminal device;
 a communication quality determination unit configured to perform determination of the communication quality between the controller and the terminal device on a basis of the index measured by the communication quality measurement unit;
 a display unit configured to display an operation screen image for the controller; and
 a display control unit configured to control display items of the operation screen image to be displayed on the display unit on a basis of result determined by the communication quality determination unit, wherein the display control unit stops displaying display items requiring real-time response and continues displaying display items not requiring real-time response when the communication quality determination unit determines that the communication quality is less than a predetermined threshold.

2. The control system according to claim 1, wherein the terminal device includes the communication quality determination unit.

3. The control system according to claim 1, wherein the controller includes the communication quality determination unit.

4. The control system according to claim 1, wherein each of the controller and the terminal device includes the communication quality measurement unit.

5. The control system according to claim 1, wherein the communication quality determination unit changes the determination of the communication quality according to timing of operation of the industrial machine.

6. The control system according to claim 1, wherein when the terminal device communicates with each of a plurality of the controllers, the communication quality determination unit determines the communication quality between each of the plurality of controllers and the terminal device, and the display control unit causes the display unit to display a plurality of the operation screen images respectively corresponding to the plurality of controllers, and the operation screen images respectively include the display items controlled on a basis of the communication quality between the terminal device and each of the plurality of controllers determined by the communication quality determination unit.

7. A display method of an operation screen image for a controller in a control system realized by a computer including a display unit, the control system comprising a controller configured to control an industrial machine, and a terminal device configured to communicate with the controller, the display method comprising:

a measuring step of measuring an index indicating communication quality between the controller and the terminal device;

a determination step of determining the communication quality between the controller and the terminal device on a basis of the index measured in the measuring step; and a control step of controlling display items of the operation screen image to be displayed on the display unit on a basis of result determined in the determination step, wherein the control step stops displaying display items requiring real-time response and continues displaying display items not requiring real-time response when the communication quality determination unit determines that the communication quality is less than a predetermined threshold.

* * * * *